US012548887B2

(12) United States Patent
Pu et al.

(10) Patent No.: US 12,548,887 B2
(45) Date of Patent: Feb. 10, 2026

(54) ANTENNA AND BASE STATION

(71) Applicant: HUAWEI TECHNOLOGIES CO., LTD., Shenzhen (CN)

(72) Inventors: Biao Pu, Dongguan (CN); Yong Luo, Dongguan (CN); Jinliang He, Dongguan (CN); He Cui, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 229 days.

(21) Appl. No.: 18/398,748

(22) Filed: Dec. 28, 2023

(65) Prior Publication Data

US 2024/0128643 A1 Apr. 18, 2024

Related U.S. Application Data

(63) Continuation of application No. PCT/CN2022/099040, filed on Jun. 15, 2022.

(30) Foreign Application Priority Data

Jun. 30, 2021 (CN) ......................... 202110737208.1

(51) Int. Cl.

| | |
|---|---|
| ***H01Q 1/24*** | (2006.01) |
| ***H01Q 1/02*** | (2006.01) |
| ***H01Q 1/42*** | (2006.01) |
| ***H01Q 1/52*** | (2006.01) |
| ***H01Q 19/10*** | (2006.01) |
| ***H01Q 23/00*** | (2006.01) |

(52) U.S. Cl.

CPC ............... *H01Q 1/246* (2013.01); *H01Q 1/02* (2013.01); *H01Q 1/42* (2013.01); *H01Q 1/526* (2013.01); *H01Q 19/10* (2013.01); *H01Q 23/00* (2013.01)

(58) Field of Classification Search

CPC ............ H01Q 1/02; H01Q 1/246; H01Q 1/42; H01Q 1/526; H01Q 19/10; H01Q 23/00

See application file for complete search history.

(56) References Cited

U.S. PATENT DOCUMENTS

| | | | |
|---|---|---|---|
| 8,497,813 | B2 | 7/2013 | Rodger et al. |
| 2021/0057796 | A1 | 2/2021 | Xu et al. |

FOREIGN PATENT DOCUMENTS

| | | | | |
|---|---|---|---|---|
| CN | 109004352 A | 12/2018 | | |
| CN | 110544813 A | * 12/2019 | ............ H01Q 1/526 |
| CN | 209963235 U | 1/2020 | | |
| WO | 2021016952 A1 | 2/2021 | | |

* cited by examiner

*Primary Examiner* — Robert Karacsony
(74) *Attorney, Agent, or Firm* — Maier & Maier, PLLC

(57) ABSTRACT

An antenna and a base station, where the antenna includes: a reflection plate, a radome, a heat sink, a radiating element, and a transceiver. The reflection plate has a first surface and a second surface opposite to each other, the radome is disposed on the first surface of the reflection plate, and the radome and the first surface form an enclosed first accommodating space. The radiating element is disposed in the first accommodating space, so that the first surface of the reflection plate integrates a radome installation function. The heat sink is fastened to the second surface of the reflection plate, and the heat sink and the second surface form an enclosed electromagnetic shielding space. The transceiver is located in the electromagnetic shielding space, so that the second surface of the reflection plate has an electromagnetic shielding function.

17 Claims, 10 Drawing Sheets

ANTENNA AND BASE STATION

CROSS-REFERENCE TO RELATED APPLICATION

This application is a continuation of International Application No. PCT/CN2022/099040, filed on Jun. 15, 2022, which claims priority to Chinese Patent Application No. 202110737208.1, filed on Jun. 30, 2021. The disclosures of the aforementioned applications are hereby incorporated by reference in their entireties.

TECHNICAL FIELD

The embodiments relate to the field of antenna technologies, and to an antenna and a base station.

BACKGROUND

A communication system is evolving from a 4th generation (4G) to a 5th generation (5G). An antenna in a corresponding 4G base station is mainly a passive antenna, and an antenna in a corresponding 5G base station is mainly an active massive multiple input multiple output (MIMO) antenna. A 5G MIMO antenna, for example, may include a radome (also referred to as a protective cover), an antenna module (including a radiating element, a feeding network, and a reflection plate), a radio frequency processing unit, and a heat sink.

Between the radio frequency processing unit and the antenna module, after a spurious signal of the radio frequency processing unit is radiated to the antenna module, the spurious signal is superimposed with a signal radiated by the radiating element in the antenna module, causing negative interference to an electrical indicator of the antenna. Therefore, electromagnetic shielding is required for the radio frequency processing unit. In the conventional technology, generally, the antenna module and the radio frequency processing unit are relatively independent components. The electromagnetic shielding for the radio frequency processing unit is basically implemented by adding an electromagnetic shielding cover. The electromagnetic shielding cover is usually die-cast with an aluminum alloy (or a magnesium alloy), and is used by the antenna module to shield electromagnetic interference from the radio frequency processing unit. Except for a port of a radio frequency connector, the radio frequency processing unit is completely electromagnetically shielded from the antenna module by using the electromagnetic shielding cover, and the port of the radio frequency connector implements self electromagnetic shielding by using the radio frequency connector.

In the conventional technology, a separate electromagnetic shielding cover is used between the radio frequency processing unit and the antenna module to shield an electromagnetic signal, and an independent structure is also used for a radome installation enclosure frame. The reflection plate, the electromagnetic shielding cover, and the radome installation enclosure frame overlap with one another. An overlapping region wastes materials and increases the weight, costs, and installation time of the antenna.

SUMMARY

The embodiments include an antenna and a base station, which can simplify a structure of the antenna and reduce a weight of the antenna.

According to a first aspect, an embodiment provides an antenna, including a reflection plate, a radome, a heat sink, a radiating element, and a transceiver. The reflection plate has a first surface and a second surface opposite to the first surface. The radome is disposed on the first surface of the reflection plate, and the radome and the first surface form an enclosed first accommodating space. The radiating element is disposed in the first accommodating space, so that the first surface of the reflection plate integrates a radome installation function in addition to having a reflection function, and a radome installation enclosure frame can be omitted in the antenna. The heat sink is fastened to the second surface of the reflection plate, the heat sink and the second surface form an enclosed electromagnetic shielding space. The transceiver is located in the electromagnetic shielding space, so that the second surface of the reflection plate has an electromagnetic shielding function, and an electromagnetic shielding cover can be omitted in the antenna. In the antenna provided in this embodiment, functions and structural features of three conventional components, such as a reflection plate, an electromagnetic shielding cover, and a radome installation enclosure frame in the antenna are integrated into a component of a reflection plate. That is, a reflection function, a radome installation function, and an electromagnetic shielding function are integrated into the reflection plate, so that a quantity of components in the antenna can be reduced, a weight of the antenna can be reduced, height space of the entire antenna can be reduced, and a size of an antenna product can be reduced, reducing costs.

In a possible implementation, the heat sink has a third surface fastened to the second surface. Because a gap between the third surface and the second surface may be used for transfer of an electromagnetic signal outwards, a first electromagnetic shielding part may be disposed between the third surface and the second surface, and the first electromagnetic shielding part is configured to electrically connect the third surface and the second surface, to form an enclosed electromagnetic shielding space.

In a possible implementation, to enable the first electromagnetic shielding part to implement a good effect of electrically connecting the third surface and the second surface, the first electromagnetic shielding part may be made of an electromagnetic shielding adhesive, and an adhesive property of the electromagnetic shielding adhesive may allow for filling the gap between the third surface and the second surface. The third surface of the heat sink may have a first groove. The first groove is configured to limit a position of the first electromagnetic shielding part, and the electromagnetic shielding adhesive is filled in the first groove as the first electromagnetic shielding part.

In a possible implementation, to enable the electromagnetic shielding space formed between the heat sink and the reflection plate to be sealed and waterproof for protecting components located inside the electromagnetic shielding space, a first waterproof part may be disposed between the third surface and the second surface. In addition, to implement good waterproof performance, the first waterproof part is generally located on a side that is of the first electromagnetic shielding part and that is away from the transceiver. In this way, water vapor can be prevented from infiltrating the electromagnetic shielding space from the outside through the first waterproof part. In addition, there is generally a specific spacing between the first waterproof part and the first electromagnetic shielding part, to prevent external water vapor from being in contact with the conductive first electromagnetic shielding part through the first waterproof part, so that an electromagnetic signal inside the electromagnetic shielding space is transferred to the outside.

In a possible implementation, the third surface of the heat sink may further have a second groove. There is a specific spacing between the second groove and the first groove. The second groove is configured to limit a position of the first waterproof part, to implement a good waterproof effect. The first waterproof part may be a waterproof adhesive filled in the second groove or another component having a waterproof function. The waterproof adhesive has specific elasticity. The waterproof adhesive may be a solid waterproof rubber ring or a waterproof rubber strip, or may be a gel-like waterproof adhesive formed by coating, which is not limited herein.

In a possible implementation, the heat sink may be removably fastened to the second surface via a first fastener, and the first fastener may be a component such as a screw or a buckle. For ease of installation and disassembly, the first fastener can be located on a side that is of the first waterproof part and that is away from the transceiver. That is, the first fastener is located on an outermost side. In this way, good waterproof performance can also be implemented.

In a possible implementation, the antenna may further include a feeding network connected to the radiating element, and a circuit such as a filter circuit integrated on the transceiver needs to be electrically connected to the feeding network via a signal pin.

In a possible implementation, both the feeding network and the radiating element may be located on the first surface of the reflection plate, that is, in the first accommodating space. In this case, the reflection plate may be provided with a first through-hole in a thickness direction of the reflection plate, and a first signal pin may pass through the first through-hole to connect to the feeding network. To ensure that the first signal pin can pass through the first through-hole, an aperture of the first through-hole is greater than a diameter of the first signal pin. That is, there is a gap between the first through-hole and the first signal pin, and an electromagnetic signal is transferred to the first accommodating space through the gap. Based on this, a second electromagnetic shielding part may be disposed around the first through-hole and between the first through-hole and the transceiver. The second electromagnetic shielding part is disposed around the first signal pin and is insulated from the first signal pin. The second electromagnetic shielding part isolates the first signal pin and the first through-hole from other parts of the transceiver other than the filter circuit connected to the transceiver. That is, the second electromagnetic shielding part may electrically connect the transceiver and the second surface, so that the electromagnetic signal is not transferred to the first accommodating space through the first through-hole.

In a possible implementation, the reflection plate includes a first plate body and a second plate body that are disposed opposite to each other. A surface that is of the first plate body and that is away from the second plate body is the first surface, and a surface that is of the second plate body and that is away from the first plate body is the second surface. The second plate body and the first plate body form a second accommodating space, and the feeding network is located in the second accommodating space. To implement an electrical connection between the transceiver and the feeding network, a second through-hole may be disposed on the second plate body in a thickness direction of the second plate body, and a second signal pin may pass through the second through-hole to connect to the feeding network. To ensure that the second signal pin can pass through the second through-hole, an aperture of the second through-hole is greater than a diameter of the second signal pin. That is, there is a gap between the second through-hole and the second signal pin, and an electromagnetic signal is transferred to the second accommodating space through the gap. Based on this, a third electromagnetic shielding part may be disposed around the second through-hole and between the second through-hole and the transceiver. The third electromagnetic shielding part is disposed around the second signal pin and is insulated from the second signal pin. The third electromagnetic shielding part isolates the second signal pin and the second through-hole from other parts of the transceiver other than the filter circuit connected to the transceiver. That is, the third electromagnetic shielding part may electrically connect the transceiver and the second plate body, so that the electromagnetic signal is not transferred to the second accommodating space through the second through-hole.

In a possible implementation, the reflection plate may include a plate body and a radome installation enclosure frame disposed around the plate body. Components such as the radiating element may be fastened to the plate body. One surface of the plate body used to fasten the radiating element performs the reflection function, and the other surface of the plate body cooperates with the heat sink to perform the electromagnetic shielding function. The radome installation enclosure frame is configured to fasten the radome. The radome may be removably fastened to the radome installation enclosure frame via a second fastener. The second fastener may be a component such as a screw, or may be a component such as a buckle, to facilitate installation.

In a possible implementation, the radome has a fourth surface fastened to the radome installation enclosure frame. To enable the first accommodating space formed between the radome and the reflection plate to be sealed and waterproof for protecting components located inside the first accommodating space, a second waterproof part may be disposed between the fourth surface and the first surface. In addition, to implement good waterproof performance, the second waterproof part is closer to the radiating element than the second fastener. That is, the second fastener is located on an outermost side, and is also convenient for installation and disassembly.

In a possible implementation, the radome installation enclosure frame may be a convex rib disposed around the plate body. That is, a thickness of the convex rib is greater than a thickness of the plate body. The convex rib may include a third groove. The thickened convex rib facilitates mechanical machining, and forms the third groove that surrounds the plate body. The third groove is configured to limit a position of the second waterproof part, to implement a good waterproof effect. The second waterproof part may be a waterproof adhesive filled in the third groove or another component having a waterproof function.

In a possible implementation, the reflection plate in the antenna may be rectangular, and the reflection plate may include a long edge extending in a first direction and a short edge extending in a second direction, where a length of the long edge is greater than a length of the short edge. Parts (that is, two parts adjacent to two long edges respectively) extending in the first direction in the convex rib are integrally formed with the plate body, and parts (that is, two parts adjacent to two short edges respectively) extending in the second direction in the convex rib are fastened to the plate body by welding.

In a possible implementation, the reflection plate in the antenna may also be manufactured in an integrated molding manner, that is, the plate body, the third groove, and the convex rib in the reflection plate may be integrally die-cast.

In a possible implementation, because the transceiver is placed in the electromagnetic shielding space formed by the heat sink and the reflection plate, an orthographic projection area of the transceiver on the second surface of the reflection plate is generally less than an orthographic projection area of the heat sink on the second surface of the reflection plate. The transceiver and the heat sink are fastened by using a connecting part, and the connecting part may have a heat conduction function, to implement a good heat dissipation effect. Because a quantity of components in the antenna is reduced, the size of the heat sink may be properly reduced, so that the orthographic projection area of the heat sink on the second surface of the reflection plate may be less than an orthographic projection area of the radome on the first surface of the reflection plate, to reduce the size of the antenna product.

According to another aspect, the embodiments further include a base station, where the base station includes the antenna in the foregoing solution, and further includes a pole, an antenna adjustment bracket, and a signal processing unit. The antenna adjustment bracket is disposed on the pole, the antenna is installed on the pole by using the antenna adjustment bracket, the antenna is connected to the signal processing unit via a cable, and the cable is sealed with a connecting portion of the antenna and the signal processing unit.

DETAILED DESCRIPTION OF EMBODIMENTS

Figure 1A:
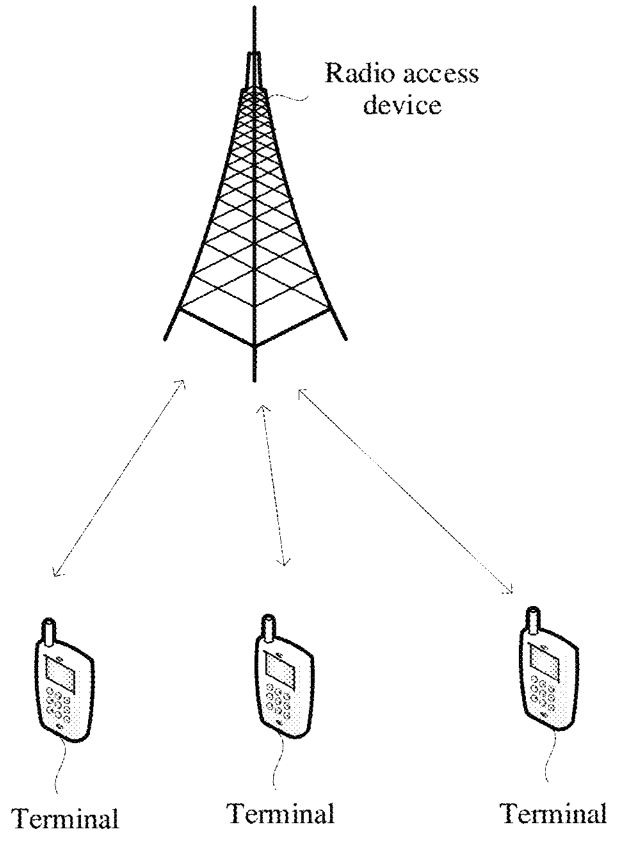
FIG. 1*a* is a schematic diagram of a system architecture to which an embodiment is applicable.

To make the objectives, solutions, and advantages clearer, the following further describes the embodiments in detail with reference to the accompanying drawings.

It should be noted that, similar reference numerals and letters in the following accompanying drawings represent similar items. Therefore, once an item is defined in an accompanying drawing, the item does not need to be further defined or interpreted in following accompanying drawings.

In descriptions of the embodiments, it should be noted that orientation or position relationships indicated by terms "center", "above", "below", "left", "right", "vertical", "horizontal", "inner", "outer", and the like are orientation or position relationships based on the accompanying drawings, and are merely intended for ease of describing this application and simplifying description, rather than indicating or implying that an apparatus or element in question needs to have a specific orientation or needs to be constructed and operated in a specific orientation. Therefore, such terms cannot be construed as a limitation. In addition, terms "first" and "second" are merely used for a purpose of description, and shall not be understood as an indication or implication of relative importance.

In descriptions of the embodiments, it should be noted that unless otherwise expressly specified and limited, terms "install", "interconnect", and "connect" should be understood in a broad sense. For example, such terms may indicate a fixed connection, a detachable connection, or an integral connection; may indicate a mechanical connection or an electrical connection; and may indicate direct interconnection, indirect interconnection through an intermediate medium, or internal communication between two elements. A person of ordinary skill in the art may understand specific meanings of the foregoing terms in the embodiments based on a specific situation.

For ease of understanding an antenna structure provided in embodiments, the following first describes an application scenario.

FIG. 1*a* is an example schematic diagram of a system architecture to which an embodiment is applicable. As shown in FIG. 1*a*, the system architecture may include a radio access network device and a terminal. For example, the system architecture includes, but is not limited to, a base station shown in FIG. 1*a*. Wireless communication may be implemented between the radio access device and the terminal. The radio access network device may be located in a base station subsystem (BBS), a UMTS terrestrial radio access network (UTRAN), or an evolved universal terrestrial radio access network (E-UTRAN), and is configured for cell coverage of a wireless signal, to implement connection between a terminal device and a wireless network radio frequency end. For example, the base station may be a base transceiver station (BTS) in a global system for mobile communications (GSM) or a code division multiple access (CDMA) system, or may be a NodeB (NB) in a wideband code division multiple access (WCDMA) system, or may be an evolved NodeB (evolutional NodeB, eNB or eNodeB) in an LTE system, or may be a radio controller in a cloud radio access network (CRAN) scenario. Alternatively, the base station may be a relay station, an access point, a vehicle-mounted device, a wearable device, or a base station in a 5G network, or a base station in a future evolved PLMN network, for example, a new radio base station. This is not limited.

Figure 1B:
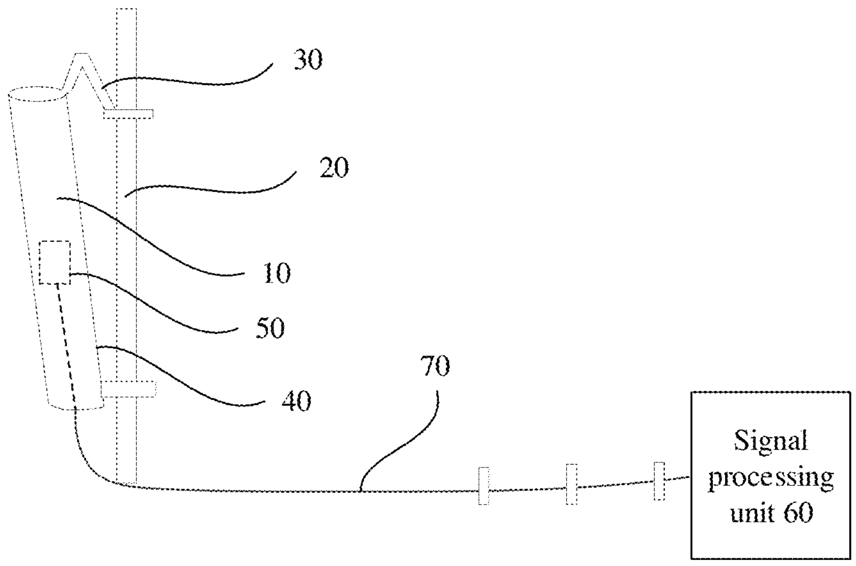
FIG. 1B is a schematic diagram of a structure of an antenna feeding system of a base station according to an embodiment shown in FIG. 1*a;*

FIG. 1B is a schematic diagram of a structure of an antenna feeding system of a base station according to an embodiment shown in FIG. 1*a*. The antenna feeding system of the base station may generally include structures such as an antenna 10, a pole 20, and an antenna adjustment bracket 30. The antenna 10 of the base station includes a radome 40. The radome 40 has a good electromagnetic wave penetration characteristic in terms of electrical performance, and can withstand impact of an external harsh environment in terms of mechanical performance, so that the antenna system can be protected from impact of the external environment. The radome 40 may be installed on the pole 20 or a tower via the antenna adjustment bracket 30, to facilitate signal receiving or transmission of the antenna 10.

In addition, the base station may further include a radio frequency processing unit 50 and a signal processing unit 60. For example, the radio frequency processing unit 50 may be configured to perform frequency selection, amplification, and down-conversion on a signal received by the antenna 10, convert the signal into an intermediate frequency signal or a baseband signal, and send the intermediate frequency signal or the baseband signal to the signal processing unit 60. Alternatively, the radio frequency processing unit 50 is configured to perform up-conversion and amplification on the signal processing unit 60 or the intermediate frequency signal, and convert the intermediate frequency signal into an electromagnetic wave by using the antenna 10 and send the electromagnetic wave. The signal processing unit 60 may be connected to a feeding structure of the antenna 10 via the radio frequency processing unit 50, and is configured to process an intermediate frequency signal or a baseband signal sent by the radio frequency processing unit 50.

As shown in FIG. 1B, the radio frequency processing unit 50 may be integrated with the antenna 10, and the signal processing unit 60 is located at a remote end of the antenna 10. The radio frequency processing unit 50 and the signal processing unit 60 may be connected via a cable 70.

Figure 2:
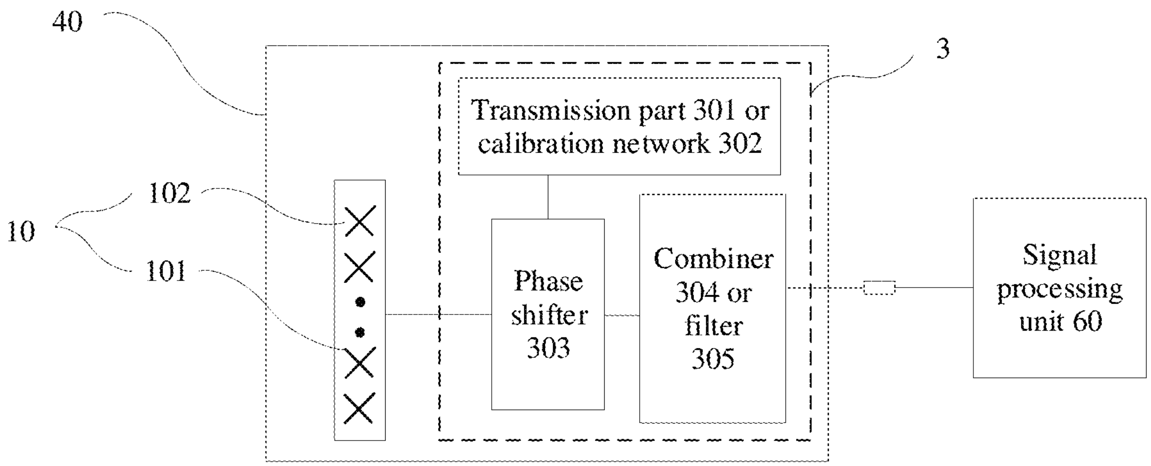
FIG. 2 is a schematic diagram of a structure of an antenna of a base station according to an embodiment.

Further, referring to FIG. 1B and FIG. 2 together. FIG. 2 is a schematic diagram of a structure of an antenna of a base station according to a possible embodiment. As shown in FIG. 2, the antenna 10 of the base station may include a radiating element 101 and a reflection plate 102. The radiating element 101 may also be referred to as a radiating part, an antenna element, an element, or the like. The radiating element 101 is a unit that forms a basic structure of an antenna array, and can effectively radiate or receive an antenna signal. In the antenna 10, frequencies of different radiating elements 101 may be the same or different. The reflection plate 102 may also be referred to as a bottom plate, an antenna panel, a metal reflection surface, or the like. The reflection plate 102 may reflect and converge antenna signals onto a receiving point. The radiating element 101 is generally placed on a surface of one side of the reflection plate 102, which can greatly enhance a signal receiving or transmitting capability of the antenna 10, and block and shield interference of other electromagnetic waves from a back side of the reflection plate 102 (in the embodiments, the back side of the reflection plate 102 is a side opposing a side that is of the reflection plate 102 and that is used to dispose the radiating element 101) to signal receiving of the antenna.

In the antenna 10 of the base station, the radiating element 101 is connected to a feeding network 3. The feeding network 3 is generally formed by a controlled impedance transmission line. The feeding network 3 may feed a signal to the radiating element 101 based on a specific amplitude and phase, or send a received signal to the signal processing unit 60 of the base station based on a specific amplitude and phase. In addition, the feeding network 3 may implement different radiation beam directions by using a transmission part 301, or may be connected to a calibration network 302 to obtain a calibration signal required by the system. The feeding network 3 may include a phase shifter 303, configured to change a maximum direction of antenna signal radiation. A combiner 304 (which may be configured to combine signals of different frequencies into one signal and transmit the signal by using the antenna 10; or when the combiner 304 is used reversely, the combiner 304 may be configured to split signals received by the antenna 10 into multiple signals based on different frequencies and transmit the signals to the signal processing unit 50 for processing), a filter 305 (which is configured to filter out interference signals), and other modules for performance expansion may be disposed in the feeding network 3.

The embodiments include an antenna and a base station. The following describes the antenna provided in the embodiments with reference to specific figures.

Figure 3:
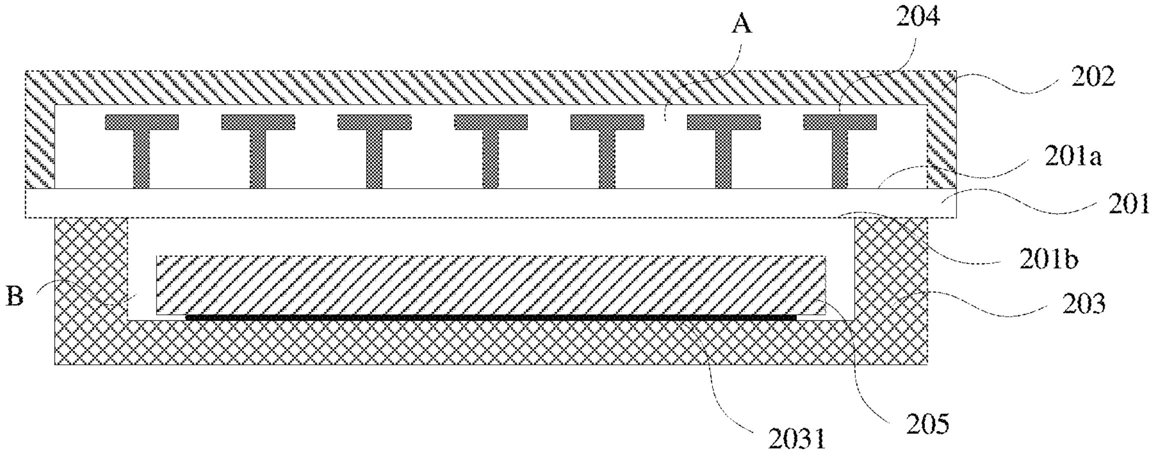
FIG. 3 is a schematic diagram of a specific structure of an antenna according to an embodiment.

FIG. 3 is an example schematic diagram of a structure of an antenna according to an embodiment. With reference to FIG. 3, in an embodiment, the antenna includes a reflection plate 201, a radome 202, a heat sink 203, a radiating element 204, and a transceiver 205 (that is, the radio frequency processing unit 50 in FIG. 1B, which is referred to as a transceiver throughout subsequent descriptions of the embodiments). The reflection plate 201 has a first surface 201*a* and a second surface 201*b* opposite to the first surface 201*a*. The radome 202 is disposed on the first surface 201*a* of the reflection plate 201 (in FIG. 3, an example in which an edge of the radome 202 is disposed on one side of the first surface 201*a* is used for description, and in some other embodiments, the edge of the radome 202 may extend to one side of the second surface 201*b* of the reflection plate 201). The radome 202 and the first surface 201*a* form an enclosed first accommodating space A, and the radiating element 204 is disposed in the first accommodating space A, so that the first surface 201*a* of the reflection plate 201 integrates a radome installation function in addition to having a reflection function. In this way, a radome installation enclosure frame can be omitted in the antenna. The heat sink 203 is fastened to the second surface 201*b* of the reflection plate 201, and the heat sink 203 and the second surface 201*b* form an enclosed electromagnetic shielding space B. An electromagnetic signal in the electromagnetic shielding space B is not transferred to the outside, and the transceiver 205 is located in the electromagnetic shielding space B, so that the second surface 201*b* of the reflection plate 201 has an electromagnetic shielding function, and an electromagnetic shielding cover can be omitted in the antenna. In the antenna provided in this embodiment, functions and structural features of three conventional components, such as a reflection plate, an electromagnetic shielding cover, and a radome installation enclosure frame in the antenna are integrated into a component of a reflection plate. That is, a reflection function, a radome installation function, and an electromagnetic shielding function are integrated into the reflection plate, so that a quantity of components in the antenna can be reduced, a weight of the antenna can be reduced, height space of the entire antenna can be reduced, and a size of an antenna product can be reduced, reducing costs.

Still with reference to FIG. 3, in some embodiments, the transceiver 205 may be a transceiver board (TRX board), which may also be referred to as a radio frequency board, a power amplifier board, a radio frequency processing unit, or the like. Because the transceiver 205 is placed in the electromagnetic shielding space B formed by the heat sink 203 and the reflection plate 201, an orthographic projection area of the transceiver 205 on the second surface 201*b* of the reflection plate 201 can be less than an orthographic projection area of the heat sink 203 on the second surface 201*b* of the reflection plate 201. For example, the transceiver 205 and the heat sink 203 are fastened by using a connecting part 2031. The connecting part 2031 may have a heat conduction function. The connecting part 2031 may be made of a material such as a thermal pad, a thermal gel, or silicone grease, to implement a good heat dissipation effect. Because a quantity of components in the antenna is reduced, the size of the heat sink 203 may be appropriately reduced. That is, the orthographic projection area of the heat sink 203 on the second surface 201*b* of the reflection plate 201 may be less than an orthographic projection area of the radome 202 on the first surface 201*a* of the reflection plate 201, to reduce the size of the antenna product.

Figure 4:
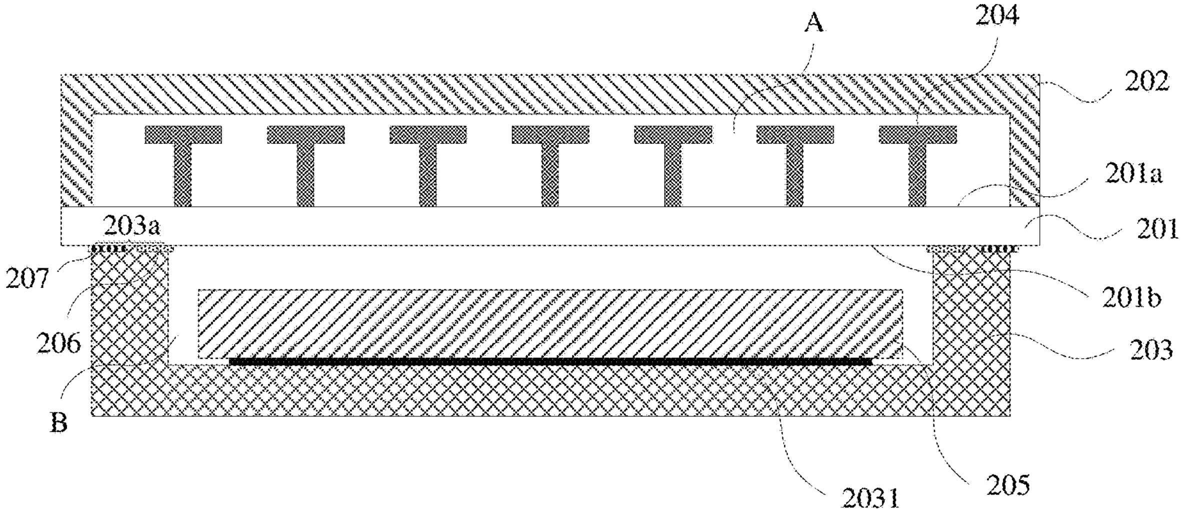
FIG. 4 is a schematic diagram of another specific structure of an antenna according to an embodiment.

FIG. 4 is an example schematic diagram of a specific structure of an antenna according to an embodiment. With reference to FIG. 4, based on the embodiment shown in FIG. 3, the heat sink 203 has a third surface 203*a* fastened to the second surface 201*b*. Because a gap between the third surface 203*a* and the second surface 201*b* may be used for transfer of an electromagnetic signal outwards, a first electromagnetic shielding part 206 may be disposed between the third surface 203*a* and the second surface 201*b*, and the first electromagnetic shielding part 206 is configured to electrically connect the third surface 203*a* and the second surface 201*b*, to form the enclosed electromagnetic shielding space B.

Still with reference to FIG. 4, based on the embodiment shown in FIG. 3, to enable the electromagnetic shielding space B formed between the heat sink 203 and the reflection plate 201 to be sealed and waterproof for protecting components located inside the electromagnetic shielding space B, a first waterproof part 207 may be disposed between the third surface 203*a* and the second surface 201*b*. In addition, to implement good waterproof performance, the first waterproof part 207 is generally located on a side that is of the first electromagnetic shielding part 206 and that is away from the transceiver 205. That is, the first waterproof part 207 is located on an outer side relative to the first electromagnetic shielding part 206. In this way, water vapor can be prevented from infiltrating the electromagnetic shielding space B from the outside through the first waterproof part 207. In addition, there is generally a specific spacing between the first waterproof part 207 and the first electromagnetic shielding part 206, to prevent external water vapor from being in contact with the conductive first electromagnetic shielding part 206 through the first waterproof part 207, so that an electromagnetic signal inside the electromagnetic shielding space B is transferred to the outside.

It should be noted that FIG. 4 merely shows the first electromagnetic shielding part 206 and the first waterproof part 207 as an example. Specific positions of the first electromagnetic shielding part 206 and the first waterproof part 207, shapes of the first electromagnetic shielding part 206 and the first waterproof part 207, and whether the first electromagnetic shielding part 206 and the first waterproof part 207 extend beyond the edge of the heat sink 203 are not limited.

Figure 5:
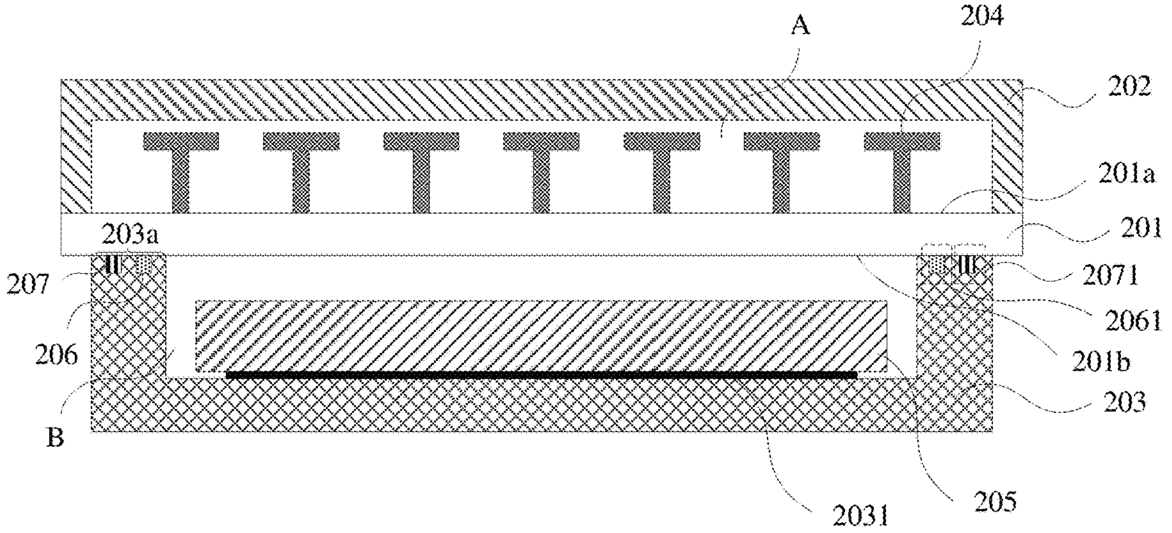
FIG. 5 is a schematic diagram of another specific structure of an antenna according to an embodiment.

FIG. 5 is an example schematic diagram of another specific structure of an antenna according to an embodiment. With reference to FIG. 5, based on the embodiment shown in FIG. 4, to enable the first electromagnetic shielding part 206 to implement a good effect of electrically connecting the third surface 203*a* and the second surface 201*b*, the first electromagnetic shielding part 206 may be made of an electromagnetic shielding adhesive. An adhesive property of the electromagnetic shielding adhesive may allow for filling the gap between the third surface 203*a* and the second surface 201*b*. The electromagnetic shielding adhesive may be a solid adhesive or a gel-like adhesive, or the first electromagnetic shielding part 206 may be made of another material, which is not limited herein. The third surface 203*a* of the heat sink 203 may have a first groove 2061. The first groove 2061 is configured to limit a position of the first electromagnetic shielding part 206, and the electromagnetic shielding adhesive is filled in the first groove 2061 as the first electromagnetic shielding part 206.

Still with reference to FIG. 5, based on the embodiment shown in FIG. 4, the third surface 203*a* of the heat sink 203 may further have a second groove 2071. There is a specific spacing between the second groove 2071 and the first groove 2061. The second groove 2071 is configured to limit a position of the first waterproof part 207, to implement a good waterproof effect. The first waterproof part 207 may be a waterproof adhesive filled in the second groove 2071 or another component having a waterproof function, and the waterproof adhesive has specific elasticity. The waterproof adhesive may be a solid waterproof rubber ring or a waterproof rubber strip, or may be a gel-like waterproof adhesive formed by coating, which is not limited herein.

Figure 6:
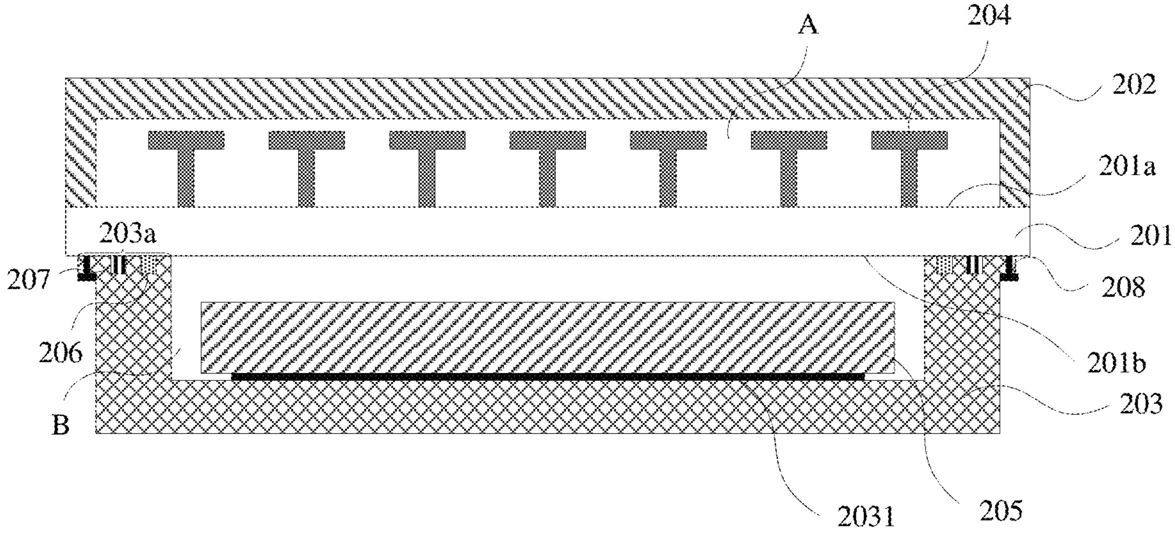
FIG. 6 is a schematic diagram of another specific structure of an antenna according to an embodiment.
Figure 7:
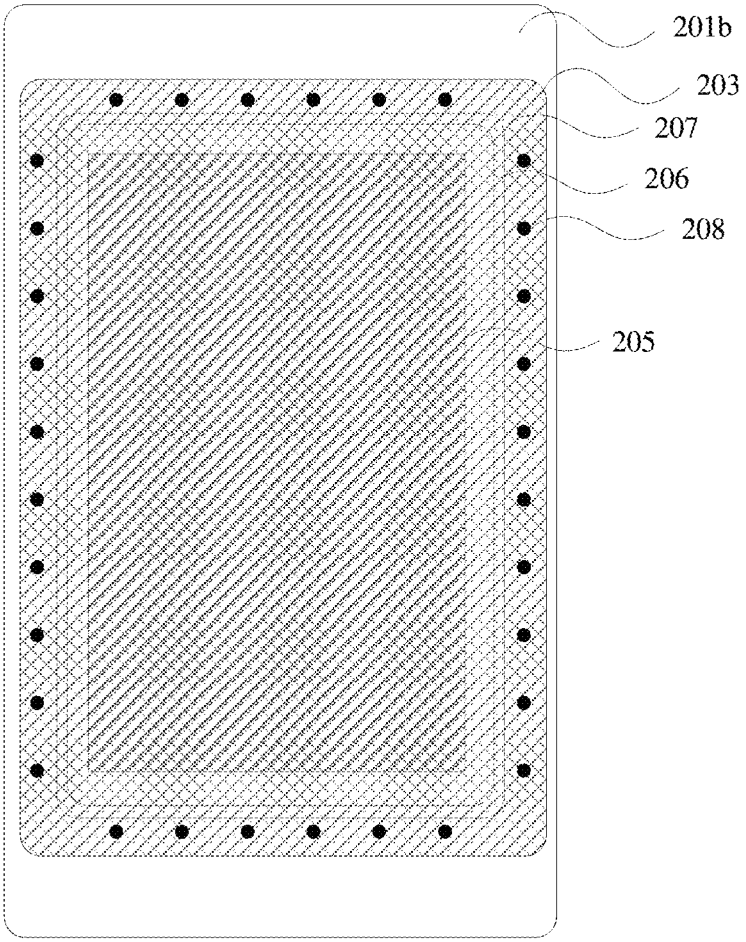
FIG. 7 is a schematic diagram of a structure of a side of a second surface of a reflection plate in an antenna according to an embodiment.

FIG. 6 is an example schematic diagram of another specific structure of an antenna according to an embodiment. FIG. 7 is an example schematic diagram of a structure of a side of a second surface 201*b* of a reflection plate in an antenna according to an embodiment. With reference to FIG. 6, based on any one of the embodiments shown in FIG. 4 and FIG. 5, the heat sink 203 may be removably fastened to the second surface 201*b* via a first fastener 208, and the first fastener 208 may be a component such as a screw or a buckle. With reference to FIG. 6 and FIG. 7, for ease of installation and disassembly, the first fastener 208 may be located on a side that is of the first waterproof part 207 and that is away from the transceiver 205. That is, the first fastener 208 is located on an outermost side. In this way, good waterproof performance can also be implemented.

Figure 8:
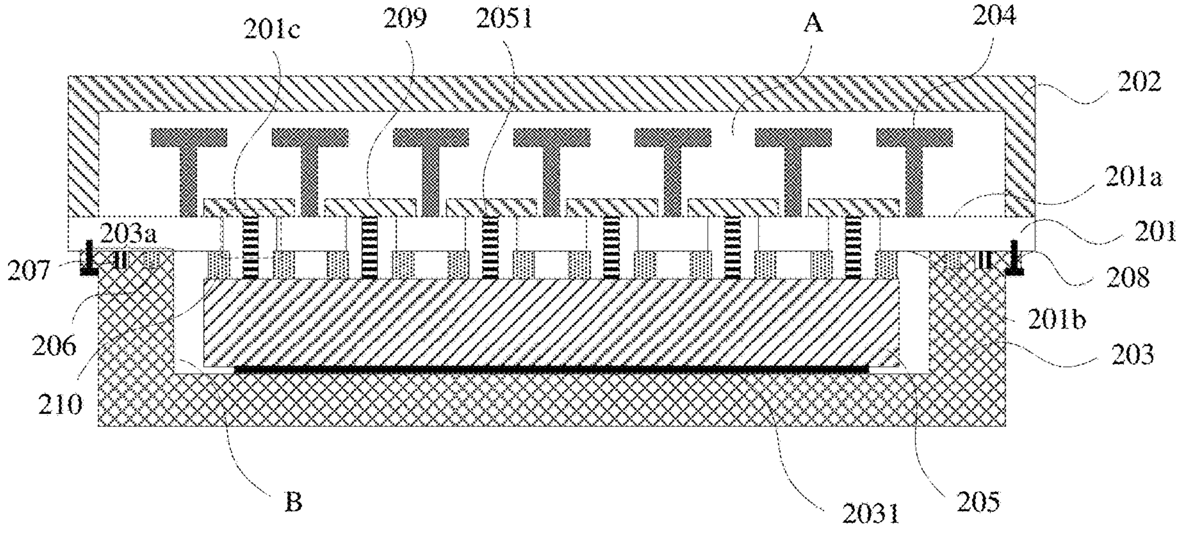
FIG. 8 is a schematic diagram of another specific structure of an antenna according to an embodiment.
Figure 9:
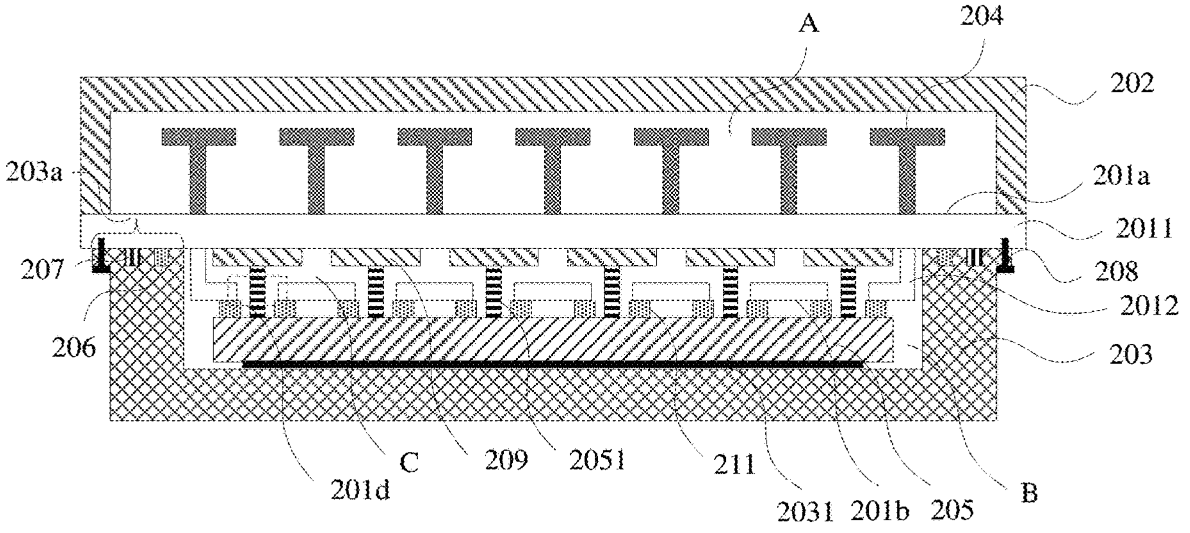
FIG. 9 is a schematic diagram of another specific structure of an antenna according to an embodiment.

FIG. 8 is an example schematic diagram of another specific structure of an antenna according to an embodiment. FIG. 9 is an example schematic diagram of another specific structure of an antenna according to an embodiment. With reference to FIG. 8 and FIG. 9, based on any one of the embodiments shown in FIG. 3 to FIG. 7, the antenna may further include a feeding network 209 connected to the radiating element 204. A circuit such as a filter circuit integrated on the transceiver 205 needs to be electrically connected to the feeding network 209 via a signal pin 2051.

With reference to FIG. 8, based on any one of the embodiments shown in FIG. 3 to FIG. 7, both the feeding network 209 and the radiating element 204 may be located on the first surface 201*a* of the reflection plate, that is, in the first accommodating space A. In this case, the reflection plate 201 may be provided with a first through-hole 201*c* in a thickness direction of the reflection plate 201, and a signal pin 2051 may pass through the first through-hole 201*c* to connect to the feeding network 209. In FIG. 8, an example in which each feeding network 209 is electrically connected to the transceiver 205 via a separate signal pin 2051 and a first through-hole 201*c* is used for illustration. Alternatively, after all feeding networks 209 are electrically connected to each other, the feeding networks 209 may be electrically connected to the transceiver 205 via a signal pin 2051 and a first through-hole 201*c*, which is not shown herein. To ensure that the signal pin 2051 can pass through the first through-hole 201*c*, an aperture of the first through-hole 201*c* is greater than a diameter of the signal pin 2051. That is, there is a gap between the first through-hole 201*c* and the signal pin 2051, and an electromagnetic signal is transferred to the first accommodating space A through the gap. Based on this, a second electromagnetic shielding part 210 may be disposed around the first through-hole 201*c* and between the first through-hole 201*c* and the transceiver 205. The second electromagnetic shielding part 210 is disposed around the signal pin 2051 and is insulated from the signal pin 2051. The second electromagnetic shielding part 210 isolates the signal pin 2051 and the first through-hole 201*c* from other parts of the transceiver 205 other than the filter circuit connected to the transceiver. That is, the second electromagnetic shielding part 210 may electrically connect the transceiver 205 and the second surface 201*b*, so that the electromagnetic signal is not transferred to the first accommodating space A through the first through-hole 201*c*. To enable the second electromagnetic shielding part 210 to implement a good effect of electrically connecting the transceiver 205 and the second surface 201*b*, the second electromagnetic shielding part 210 may be made of an electromagnetic shielding adhesive. Alternatively, the second electromagnetic shielding part 210 may be made of another material, which is not limited herein.

With reference to FIG. 9, based on any one of the embodiments shown in FIG. 3 to FIG. 7, the reflection plate 201 includes a first plate body 2011 and a second plate body 2012 that are disposed opposite to each other. A side that is of the first plate body 2011 and that is away from the second plate body 2012 is the first surface 201*a*, and a side that is of the second plate body 2012 and that is away from the first plate body 2011 is the second surface 201*b*. The second plate body 2012 and the first plate body 2011 form a second accommodating space C, and the feeding network 209 is located in the second accommodating space C. FIG. 9 is described by using an example in which a plurality of feeding networks 209 are located in a same second accommodating space C. In an actual application, a separate second plate body 2012 may also be disposed for each feeding network 209 to form a separate second accommodating space C. To implement an electrical connection between the transceiver 205 and the feeding network 209, a second through-hole 201*d* may be disposed on the second plate body 2012 in a thickness direction of the second plate body 2012, and a signal pin 2051 may pass through the second through-hole 201*d* to connect to the feeding network 209. In FIG. 8, an example in which each feeding network 209 is electrically connected to the transceiver 205 via a separate signal pin 2051 and a second through-hole 201*d* is used for illustration. Alternatively, after all feeding networks 209 are electrically connected to each other, the feeding networks 209 may be electrically connected to the transceiver 205 via a signal pin 2051 and a second through-hole 201*d*, which is not shown herein. To ensure that the signal pin 2051 can pass through the second through-hole 201*d*, an aperture of the second through-hole 201*d* is greater than a diameter of the signal pin 2051. That is, there is a gap between the second through-hole 201*d* and the signal pin 2051, and an electromagnetic signal is transferred to the second accommodating space B through the gap. Based on this, a third electromagnetic shielding part 211 may be disposed around the second through-hole 201*d* and between the second through-hole 201*d* and the transceiver 205. The third electromagnetic shielding part 211 is disposed around the signal pin 2051 and is insulated from the signal pin 2051. The third electromagnetic shielding part 211 isolates the signal pin 2051 and the second through-hole 201*d* from other parts of the transceiver 205 other than the filter circuit connected to the transceiver 205. That is, the third electromagnetic shielding part 211 may electrically connect the transceiver 205 and the second plate body 2012, so that the electromagnetic signal is not transferred to the second accommodating space B through the second through-hole 201*d*. To enable the third electromagnetic shielding part 211 to implement a good effect of electrically connecting the transceiver 205 and the second plate body 2012, the third electromagnetic shielding part 211 may be made of an electromagnetic shielding adhesive, or the third electromagnetic shielding part 211 may be made of a material such as an electromagnetic shielding film, which is not limited herein.

Figure 10:
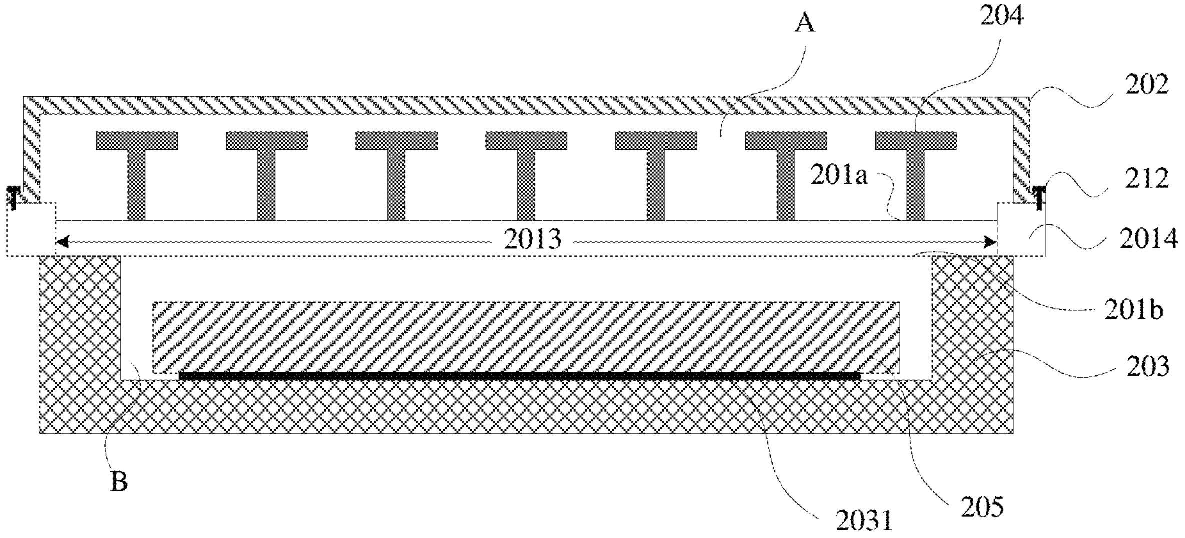
FIG. 10 is a schematic diagram of another specific structure of an antenna according to an embodiment.

FIG. 10 is an example schematic diagram of another specific structure of an antenna according to an embodiment. With reference to FIG. 10, based on any one of the embodiments shown in FIG. 3 to FIG. 9, the reflection plate 201 may include a plate body 2013 and a radome installation enclosure frame 2014 disposed around the plate body 2013. Components such as the radiating element 204 may be fastened to the plate body 2013. One surface of the plate body 2013 used to fasten the radiating element 204 performs the reflection function, and the other surface of the plate body 2013 cooperates with the heat sink 203 to perform the electromagnetic shielding function. The radome installation enclosure frame 2014 is configured to fasten the radome 202. For example, the radome 202 may be removably fastened to the radome installation enclosure frame 2014 via a second fastener 212. The second fastener 212 may be a component such as a screw, or may be a component such as a buckle. A width of the radome installation enclosure frame 2014 may be controlled to be about 20 mm, to facilitate installation.

Figure 11:
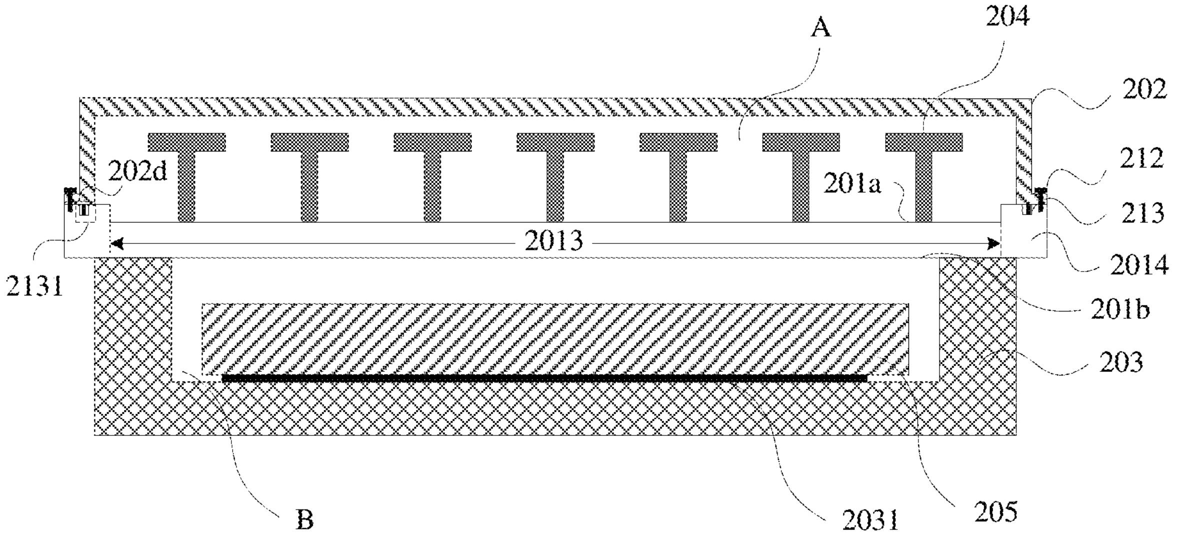
FIG. 11 is a schematic diagram of another specific structure of an antenna according to an embodiment.

FIG. 11 is an example schematic diagram of another specific structure of an antenna according to an embodiment. With reference to FIG. 11, based on the embodiment shown in FIG. 10, the radome 202 has a fourth surface 202*d* fastened to the radome installation enclosure frame 2014. That is, it may be considered that the fourth surface 202*d* of the radome 202 is a surface in contact with the radome installation enclosure frame 2014. To enable the first accommodating space A formed between the radome 202 and the reflection plate 201 to be sealed and waterproof for protecting components located inside the first accommodating space A, a second waterproof part 213 may be disposed between the fourth surface 202*d* and the first surface 201*a*. In addition, to implement good waterproof performance, the second waterproof part 213 is closer to the radiating element 204 than the second fastener 212. That is, the second fastener 212 is located on the outermost side, which facilitates installation and disassembly.

Still with reference to FIG. 11, based on any embodiment shown in FIG. 10, the radome installation enclosure frame 2014 may be a convex rib disposed around the plate body 2013. A thickness of the convex rib is greater than a thickness of the plate body 2013. For example, when the thickness of the plate body 2013 is about 2 mm, the thickness of the convex rib may be about 5 mm. The convex rib may include a third groove 2131. The thickened convex rib facilitates mechanical machining, and forms a third groove 2131 that surrounds the plate body 2013. The third groove 2131 is configured to limit a position of the second waterproof part 213, to implement a good waterproof effect. The second waterproof part 213 may be a waterproof adhesive filled in the third groove 2131 or another component having a waterproof function. The waterproof adhesive may be a waterproof rubber ring or a waterproof rubber strip, which is not limited herein.

Figure 12:
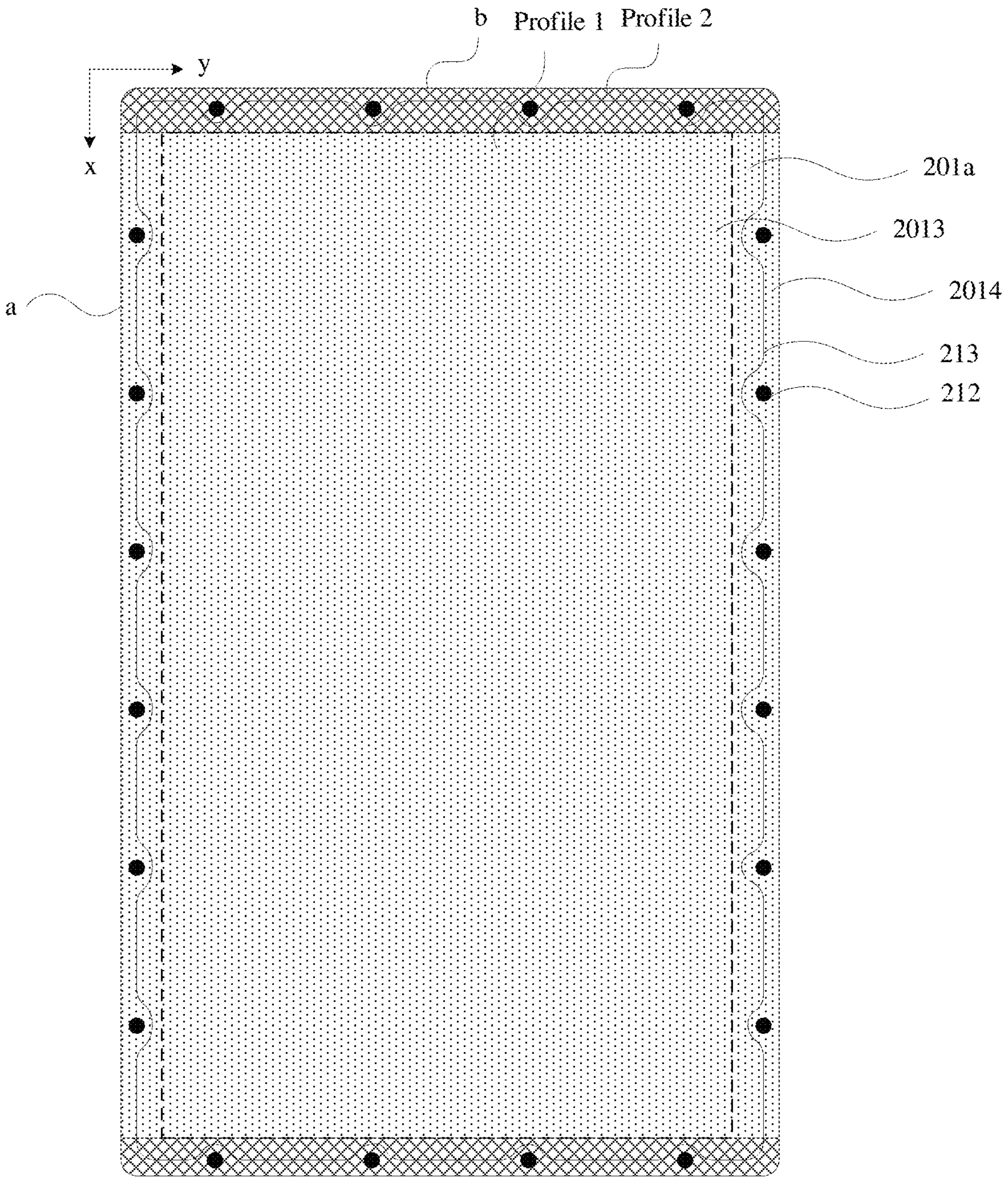
FIG. 12 is a schematic diagram of a structure of a side of a first surface of a reflection plate in an antenna according to an embodiment.
Figure 13:
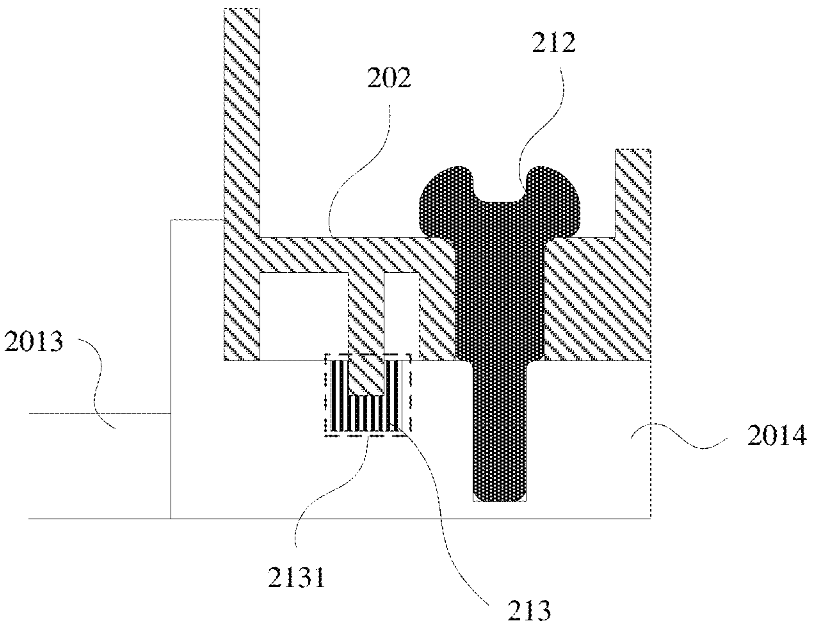
FIG. 13 is a partial schematic diagram of a structure of a connection between a reflection plate and a radome in an antenna according to an embodiment.

FIG. 12 is an example schematic diagram of a structure of a side of a first surface 201*a* of a reflection plate in an antenna according to an embodiment. FIG. 13 is an example partial schematic diagram of a structure of a connection between a reflection plate and a radome in an antenna according to an embodiment. With reference to FIG. 12, based on the embodiment shown in FIG. 11, the reflection plate 201 in the antenna may be rectangular. Therefore, the reflection plate 201 may include a long edge a extending in a first direction x and a short edge b extending in a second direction y, where a length of the long edge a is greater than a length of the short edge b. Parts (that is, two parts adjacent to two long edges a respectively) extending in the first direction x in the convex rib are integrally formed with the plate body 2013 and parts (that is, two parts adjacent to two short edges b respectively) extending in the second direction y in the convex rib are fastened to the plate body 2013 by welding. For example, during manufacturing, the integrally formed plate body 2013 and the convex rib parts located on the two sides of the long edge a of the plate body 2013 may be obtained by pulling and extruding a profile 1. The convex ribs fastened to the two sides of the short edge b of the plate body 2013 are made of a profile 2. Then, the profile 1 and the profile 2 may be combined by friction stir welding, laser welding, argon arc welding, and the like. Materials of the profile 1 and the profile 2 may be the same or different, which is not limited herein. Then, the third groove 2131 may be processed at the edge of the reflection plate 201, that is, at the position of the convex rib, in a mechanical machining manner, and the third groove 2131 is filled with compressible waterproof adhesive as the second waterproof part 213. With reference to FIG. 13, when the radome 202 is fastened to the convex rib via the second fastener 212 (for example, a screw), the waterproof adhesive is compressed by the radome 202, so that the radome 202, the waterproof rubber ring, and the reflection plate 201 are closely attached together with a locking pressure, to form the sealed waterproof first accommodating space A, and ensure waterproof performance of internal components located in the first accommodating space A. In addition, when the radome 202 is manufactured by using injection molding, a hollowed part (a part that is not filled between 202 and 2014 in FIG. 13) shown in FIG. 13 appears based on a shape of the mold.

Figure 14:
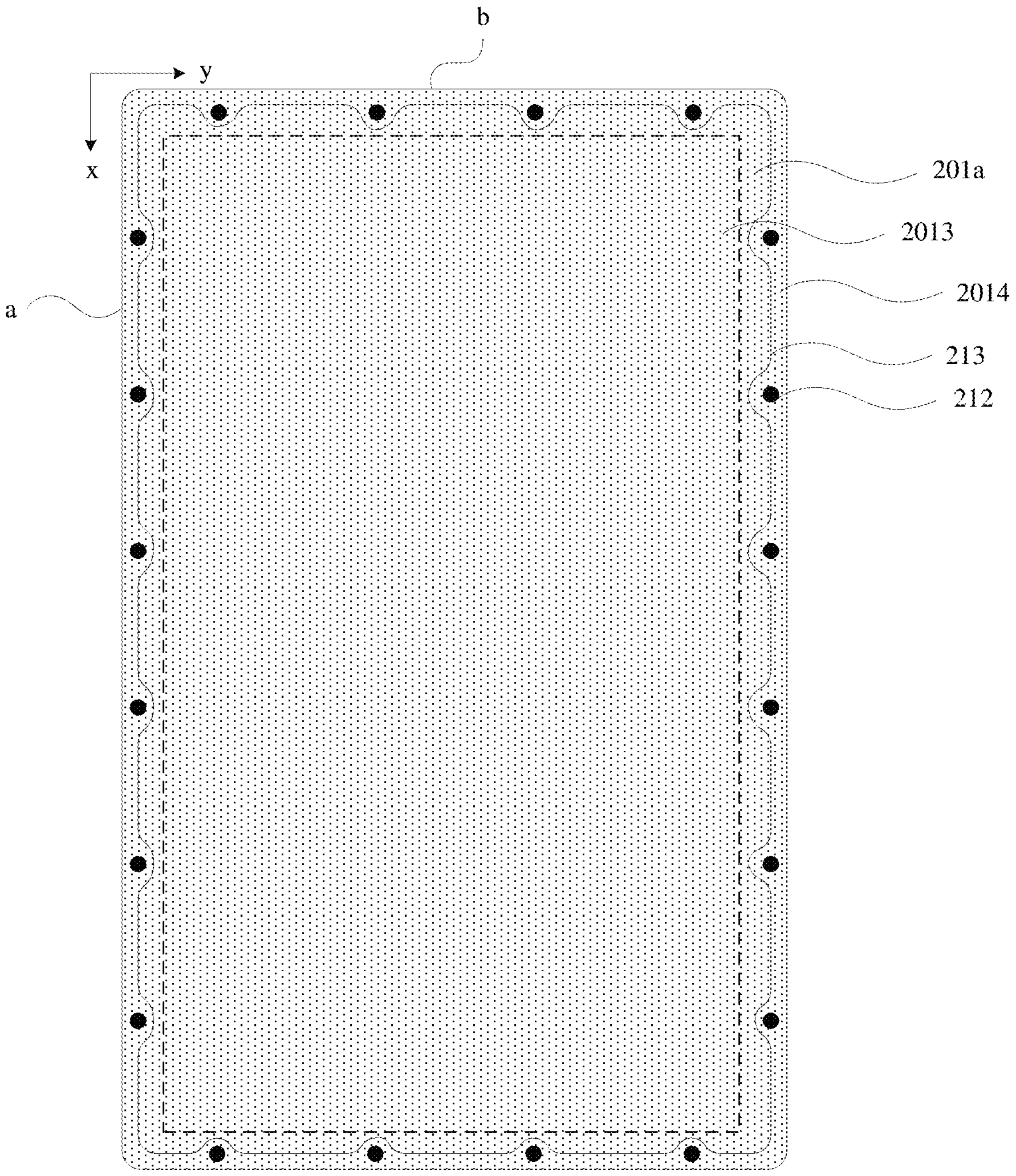
FIG. 14 is a schematic diagram of another structure of a side of a first surface of a reflection plate in an antenna according to an embodiment.

FIG. 14 is a schematic diagram of another structure of a side of a first surface 201*a* of a reflection plate in an antenna according to an embodiment. With reference to FIG. 14, based on the embodiment shown in FIG. 11, the reflection plate 201 in the antenna may also be manufactured in an integrated molding manner. That is, the plate body 2013, the third groove 2131, and the convex rib in the reflection plate 201 may be integrally die-cast. For example, die casting may be performed by using an aluminum alloy (or a magnesium alloy).

Figure 15:
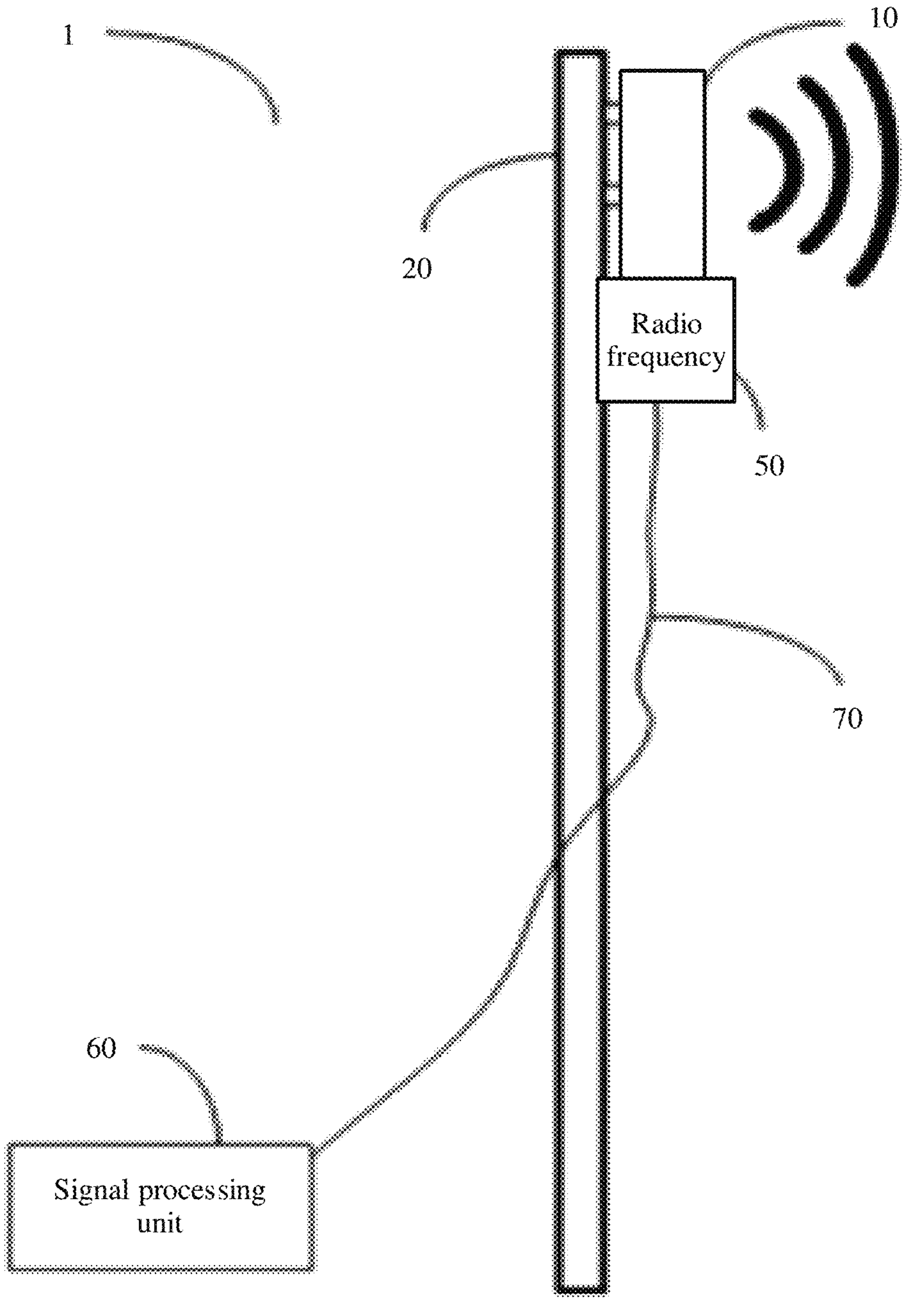
FIG. 15 is a schematic diagram of a structure of a base station according to an embodiment.

According to another aspect, with reference to FIG. 15, an implementation provides a base station 1, including the antenna 10 in any one of the foregoing implementations. There may be a plurality of antennas 10, the plurality of antennas 10 are distributed in an array, and each antenna 10 may transmit or receive signals of a same frequency band or different frequency bands. The base station 1 further includes a signal processing unit 60. The signal processing unit 60 is connected to a feeding network of the antenna 10 via a radio frequency processing unit 50 (that is, a transceiver). The antenna 10 is configured to convert a received electromagnetic wave into an electrical signal and transmit the electrical signal to the radio frequency processing unit 50, or convert an electrical signal from the radio frequency processing unit 50 into an electromagnetic wave and send the electromagnetic wave. The radio frequency processing unit 50 is configured to perform frequency selection, amplification, and down-conversion on an electrical signal from the antenna 10, convert the electrical signal into an intermediate frequency signal or a baseband signal, and send the intermediate frequency signal or the baseband signal to the signal processing unit 60. Alternatively, the radio frequency processing unit 50 is configured to perform up-conversion and amplification on the baseband signal or the intermediate frequency signal from the signal processing unit 60, and send the baseband signal or the intermediate frequency signal through the antenna 10. The signal processing unit 60 is configured to process the intermediate frequency signal or the baseband signal sent by the radio frequency processing unit 50.

As shown in FIG. 15, the radio frequency processing unit 50 and the antenna 10 are integrated and located inside the antenna 10, the antenna 10 is installed on a pole 20 or a tower, and the signal processing unit 60 is located at a remote end of the antenna 10 and is connected to the radio frequency processing unit 50 via a cable 70.

It should be noted that the foregoing units, functions of the units, and relationships between the units included in the base station 1 are merely examples for description, and do not limit composition of the base station 1.

It is clear that a person skilled in the art can make various modifications and variations to the embodiments without departing from the spirit and scope of the embodiments. The embodiments are intended to cover these modifications and variations provided that they fall within the scope of defined by the embodiments and their equivalent technologies.

What is claimed is:

1. An antenna, comprising:

a reflection plate, wherein the reflection plate has a first surface and a second surface, and the first surface is opposite to the second surface;

a radome, wherein the radome covers the first surface, and the radome and the first surface form an enclosed first accommodating space;

a heat sink, wherein the heat sink is fastened to the second surface, and the heat sink and the second surface form an enclosed electromagnetic shielding space;

a radiating element, wherein the radiating element is located in the first accommodating space;

a transceiver, wherein the transceiver is located in the electromagnetic shielding space; and wherein the antenna further comprises a feeding network;

the reflection plate comprises a first plate body and a second plate body that are disposed opposite to each other, wherein a side that is of the first plate body and that is away from the second plate body is the first surface, a side that is of the second plate body and that is away from the first plate body is the second surface, the first plate body and the second plate body form a second accommodating space, and the feeding network is located in the second accommodating space;

the second plate body is provided with a second through-hole in a thickness direction of the second plate body, and the transceiver is electrically connected to the feeding network via a second signal pin that passes through the second through-hole; and a third electromagnetic shielding part is disposed around the second through-hole and between the second-through hole and the transceiver, and the third electromagnetic shielding part is disposed around the second signal pin and is insulated from the second signal pin.

2. The antenna according to claim 1, wherein the heat sink has a third surface fastened to the second surface, a first electromagnetic shielding part is disposed between the third surface and the second surface, and the first electromagnetic shielding part is configured to electrically connect the third surface and the second surface.

3. The antenna according to claim 2, wherein the third surface of the heat sink has a first groove, and the first electromagnetic shielding part is an electromagnetic shielding adhesive filled in the first groove.

4. The antenna according to claim 3, wherein the heat sink has the third surface fastened to the second surface, a first waterproof part is disposed between the third surface and the second surface, and the first waterproof part is located on a side that is of the first electromagnetic shielding part and that is away from the transceiver.

5. The antenna according to claim 4, wherein the third surface has a second groove, and the first waterproof part is a waterproof adhesive filled in the second groove.

6. The antenna according to claim 4, wherein the heat sink is removably fastened to the second surface via a first fastener, and the first fastener is located on a side that is of the first waterproof part and that is away from the transceiver.

7. The antenna according to claim 1, wherein the reflection plate comprises a plate body and a radome installation enclosure frame disposed around the plate body, and the radome is removably fastened to the radome installation enclosure frame via a second fastener.

8. The antenna according to claim 7, wherein the radome has a fourth surface fastened to the radome installation enclosure frame, and a second waterproof part is disposed between the fourth surface and the first surface.

9. The antenna according to claim 8, wherein the radome installation enclosure frame is a convex rib disposed around the plate body, the convex rib comprises a third groove, and the second waterproof part is a waterproof adhesive filled in the third groove.

10. The antenna according to claim 9, wherein the reflection plate comprises a long edge extending in a first direction and a short edge extending in a second direction; and a part extending in the first direction in the convex rib is integrally formed with the plate body, and a part extending in the second direction in the convex rib is fastened to the plate body by welding.

11. The antenna according to claim 9, wherein the plate body, the third groove, and the convex rib are integrally die-cast.

12. The antenna according to claim 1, wherein an orthographic projection area of the transceiver on the second surface of the reflection plate is less than an orthographic projection area of the heat sink on the second surface of the reflection plate, and the orthographic projection area of the heat sink on the second surface of the reflection plate is less than an orthographic projection area of the radome on the first surface of the reflection plate.

13. Abase station, comprising the antenna according to claim 1.

14. The base station according to claim 13, wherein the heat sink has a third surface fastened to the second surface, a first electromagnetic shielding part is disposed between the third surface and the second surface, and the first electromagnetic shielding part is configured to electrically connect the third surface and the second surface.

15. The base station according to claim 14, wherein the third surface of the heat sink has a first groove, and the first electromagnetic shielding part is an electromagnetic shielding adhesive filled in the first groove.

16. The base station according to claim 15, wherein the heat sink has the third surface fastened to the second surface, a first waterproof part is disposed between the third surface and the second surface, and the first waterproof part is located on a side that is of the first electromagnetic shielding part and that is away from the transceiver.

17. The base station according to claim 13, further comprising:

a pole, an antenna adjustment bracket, and a signal processing unit.

* * * * *